United States Patent [19]

Grantham

[11] 4,145,396
[45] Mar. 20, 1979

[54] TREATMENT OF ORGANIC WASTE

[75] Inventor: LeRoy F. Grantham, Calabasas, Calif.

[73] Assignee: Rockwell International Corporation, El Segundo, Calif.

[21] Appl. No.: 682,234

[22] Filed: May 3, 1976

[51] Int. Cl.$^2$ .............................................. G21F 9/30
[52] U.S. Cl. ........................... 423/22; 252/301.1 W; 423/5; 423/206 R; 423/155; 423/462
[58] Field of Search ................... 252/301.1 W; 423/5, 423/184, 22, 206 R, 155, 462

[56] References Cited

U.S. PATENT DOCUMENTS

| 3,322,509 | 5/1967 | Vogg | 423/5 |
| 3,403,985 | 10/1968 | Knacke et al. | 423/5 |
| 3,845,190 | 10/1974 | Yosim et al. | 423/184 |

FOREIGN PATENT DOCUMENTS 1194582 6/1965 Fed. Rep. of Germany ... 252/301.1 W

Primary Examiner—Benjamin R. Padgett
Assistant Examiner—Deborah L. Kyle
Attorney, Agent, or Firm—L. Lee Humphries; Henry Kolin; Clark E. DeLarvin

[57] ABSTRACT

An organic waste containing at least one element selected from the group consisting of strontium, cesium, iodine and ruthenium is treated to achieve a substantial reduction in the volume of the waste and provide for fixation of the selected element in an inert salt. The method of treatment comprises introducing the organic waste and a source of oxygen into a molten salt bath maintained at an elevated temperature to produce solid and gaseous reaction products. The gaseous reaction products comprise carbon dioxide and water vapor, and the solid reaction products comprise the inorganic ash constituents of the organic waste and the selected element which is retained in the molten salt. The molten salt bath comprises one or more alkali metal carbonates, and may optionally include from 1 to about 25 wt.% of an alkali metal sulfate.

10 Claims, 1 Drawing Figure

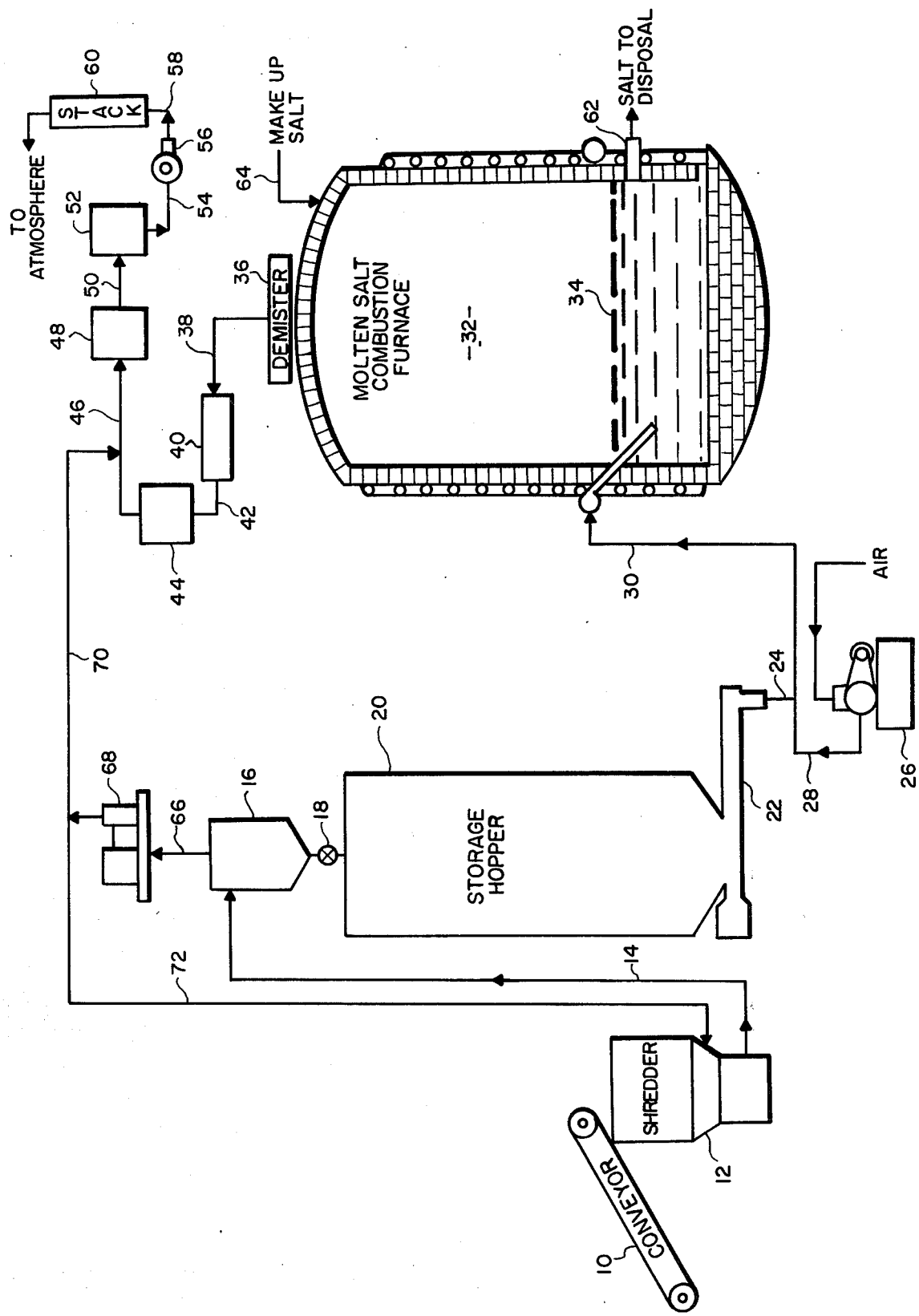

TREATMENT OF ORGANIC WASTE

BACKGROUND OF THE INVENTION

1. Field of the Invention

This invention relates to a waste control process for the treatment of an organic waste containing certain selected elements. It particularly relates to a molten salt process for reducing the volume of an organic waste material contaminated with at least one radioactive element selected from the group consisting of strontium, cesium, iodine and ruthenium, whereby the selected radioactive element is retained in the molten salt.

2. Prior Art

In the processing of fuel for nuclear reactors, and in the operation of such reactors, a considerable amount of waste material is generated, which is contaminated with radioactive elements. It is reported that the various Energy Research and Development Administration (ERDA) facilities generate approximately 350,000 cu. ft. of solid transuranic waste per year. Since the current costs of storing such waste are high and are likely to increase, there is an urgent economic incentive to reduce the volume of such waste.

The majority of the waste is made up of combustible materials such as rags, paper, plastic and rubber. A summary of the characteristics of the solid waste is given in the table below.

| Characteristics of Typical Solid Low Level Radioactive Waste (Source: ERDA) | |
|---|---|
| Composition (wt. %) | |
| Paper | 55 |
| Rags | 5 |
| Plastic (50% polyvinyl chloride and 50% polyethylene) | 30 |
| Rubber | 10 |
| Radioactive Elements | 0.001 – 0.1 |
| Bulk Density (lb/cf) | 7 |
| Ash Content (%) | 8 |
| Heating Value (Btu/lb) | 9,000 – 12,000 |

Because of the high proportion of halogenated (usually chlorinated) plastic and the danger of carryover of radioactive elements in the form of particulates of gases, a conventional incinerator is not wholly satisfactory for the combustion of such material as a means of volume reduction. Thus, more complex incinerators or special combustion methods are required. More particularly, in processing such waste, ideally as much volume reduction as possible is desired with a minimum of pollution.

Various processes have been suggested for treating different types of radioactive waste. None of these processes, however, have proven altogether satisfactory. British Pat. No. 1,035,330 discloses a process and apparatus for treating solid radioactive wastes. The patent suggests that low level radioactive wastes be incinerated in a furnace to reduce their volume, and a multistep filtering technique for combustion gases is proposed. The disadvantage of this process is that it requires elaborate filters for the offgases.

U.S. Pat. No. 3,479,295 suggests a method of reducing a radioactive waste solution, obtained in the processing of nuclear fuel elements, to dryness. Broadly, the process comprises passing an oxygen-containing gas upwardly through a bed of particles, formed by calcination of the salts in the waste solution, to fluidize the bed and feeding additional waste solution into the fluidized bed so formed. A hydrocarbon fuel also is introduced into the fluidized bed in the presence of nitrate ions at a temperature above the ignition temperature of the fuel to burn the fuel and provide the heat necessary to evaporate the solution and calcine the salts contained therein. A disadvantage of this process is that it requires a source of nitrate ions and does not provide for the retention of any volatile elements as stable solid components.

In U.S. Pat. No. 3,716,490 there is disclosed another method for the treatment of radioactive liquids. The method comprises providing a solid, fusible, partly sulfonated bituminous substance and contacting that substance with a liquid waste containing radioactive ions to ion exchange the radioactive ions with the sulfonated portion of the bituminous substance. Thereafter, the bituminous substance is melted to reduce its volume and encapsulate the radioactive ions. Thus, while this patent provides a method for reducing the volume of radioactive waste, it does not provide a means for isolation and retention of any volatile radioactive elements as solid compounds.

U.S. Pat. No. 3,764,552 discloses a method for storing radioactive combustible waste material. The method comprises the steps of placing the waste material in a container provided with oxide getters selected from the group consisting of magnesium oxide, calcium oxide, barium oxide, and strontium oxide in an amount sufficient to react with sorbed water and combustion products formed by oxidation and pyrolysis of the waste material. The container then is sealed and heated to pyrolyze the waste.

In other processes, an actinide-containing waste material is combusted and encapsulated. Examples of patents relating to such processes are U.S. Pat. Nos. 3,008,904; 3,262,885; and 3,332,884.

The combustion per se of carbonaceous fuels and carbon-containing wastes in a molten alkali metal salt for various purposes is known. U.S. Pat. No. 3,710,737 shows the generation of heat for external use employing a variety of carbonaceous materials. U.S. Pat. Nos. 3,567,412; 3,708,270 and 3,916,617 show the use of such techniques for the production of pyrolysis gases. In U.S. Pat. Nos. 3,778,320 and 3,845,190, such techniques are involved, respectively, in the non-polluting disposal of explosives and of organic pesticides. In U.S. Pat. No. 3,899,322, valuable metals are recovered from organic scrap in a molten salt bath. None of these patents are concerned with the treatment of radioactive wastes for the isolation and retention of volatile radioactive elements.

In U.S. Pat. application Ser. No. 682,235, filed of even date herewith and assigned to the assignee of the present invention, there is proposed a method for treating an actinide-containing waste. In accordance with that method an actinide-containing organic waste is treated in a molten alkali metal carbonate bath to reduce the volume of waste and provide for recovery of the actinide element. The organic waste and oxygen are introduced into the molten salt bath, which is maintained at an elevated temperature to produce solid and gaseous reaction products. The actinide element and inorganic ash constituents of the waste are retained in the molten salt. A portion of the molten salt is withdrawn and quenched in an aqueous medium to dissolve the salt constituents. The medium then is filtered to remove the insoluble inorganic ash constituents and the actinide element. The filter cake containing the actinide element is leached with inorganic acid to solubilize and recover the actinide elements therefrom.

While the foregoing application discloses a satisfactory method for the treatment of an organic waste containing actinide elements, it does not discuss the treatment of other radioactive elements which may result from nuclear fission. Specifically, in the fission reaction wherein the source of fuel is principally an actinide element such as uranium or plutonium or mixtures thereof, various other radioactive elements are formed, such as radioactive rare earths. However, a principal concern is with the elements strontium, iodine, ruthenium and cesium. Strontium is of particular concern because of its long half-life, and the fact that it is absorbed by the human body into the bone marrow. Iodine also is particularly dangerous in that it is absorbed into the thyroid gland. In addition, cesium, ruthenium, and iodine form compounds which are volatile and difficult to contain. Elemental iodine readily vaporizes at room temperature and thus is even more difficult to contain. Clearly, there is a need for a method of treating organic wastes contaminated with such elements as strontium, iodine, cesium, and ruthenium, whereby the volume of such waste is reduced and the elements are retained as stable solid compounds.

SUMMARY OF THE INVENTION

In accordance with the present invention, it has been found that when an organic waste contaminated with at least one element selected from the group consisting of strontium, cesium, iodine, and ruthenium is treated in a molten salt at elevated temperatures, it is possible to achieve a substantial reduction in the volume of the organic waste, and further, the selected element is retained in the molten salt. Broadly, the method comprises introducing an organic waste containing the selected element and a source of gaseous oxygen such as air into a molten salt comprising an alkali metal carbonate. The bath is maintained at a temperature of from about 400° C. to 1000° C. and a pressure within the range of from about 0.5 to 10 atmospheres to at least partially oxidize the organic waste. Complete combustion is generally preferred. Under such conditions, the volume of the organic waste is substantially reduced, and solid and gaseous combustion products are formed. The gaseous combustion products consist essentially of carbon dioxide and water vapor, and the solid products comprise the inorganic ash constituents of the waste; the selected element being retained in the molten salt.

The molten salt may be either a single alkali metal carbonate or a mixture of two or more alkali metal carbonates and may include at least one and up to about 25 wt. % of an alkali metal sulfate. The advantage of the inclusion of the sulfate is that it enhances the combustion rate of the organic material; see, for example, U.S. Pat. No. 3,567,412. The preferred alkali metal carbonates are the lithium, sodium, and potassium carbonates.

Where it is desired to perform the combustion of the organic waste at a relatively low temperature, a low melting binary or ternary mixture of alkali metal carbonates may be utilized. For example, the ternary alkali metal carbonate eutectic consisting of 43.5, 31.5, and 25.0 mole percent of the carbonates of lithium, sodium, and potassium, respectively, melts at about 397° C. A preferred binary mixture is the sodium carbonate-potassium carbonate eutectic which melts at about 710° C. When the principal consideration is the cost of the molten salt, which ultimately is disposed of, a particularly preferred salt comprises sodium carbonate and optionally containing from 1 to 25 wt.% sodium sulfate, which may be used at a temperature between about 750° and 1000° C.

The exact pressure and temperature utilized are not critical, provided, of course, that they are so selected as to be above the melting point of the salt and below its decomposition temperature. Generally, the temperature and pressure will be within the range of from about 700° to 1000° C. and from 0.5 to 10 atmospheres. A temperature of from about 800° to 900° C. and a pressure of from about 0.8 to 1.0 atmospheres are generally preferred, particularly with sodium carbonate.

Typical organic waste materials generally have a sufficiently high heating value to maintain the molten salt at a desired temperature. However, where the heating value of the waste material is insufficient to maintain the desired temperature, any carbonaceous material such as coal, tar, petroleum residuals and the like, may be added to the feed to increase its heating value.

The organic waste and a source of oxygen are introduced into the molten salt. Generally, the source of oxygen will be air in the interest of economy. Thus, the effluent gases will also include nitrogen when air is used and may also include unreacted oxygen. However, when it is desired to reduce the volume of gaseous products, pure oxygen can be used. Alternatively, of course, oxygen-enriched air also may be utilized.

In view of the economic importance of reducing the volume of organic waste contaminated with radioactive fission products and the obvious need to attain such radioactive products in a substantially stable solid form, the present invention will be described with reference to the treatment of such waste. In accordance with the present method, such typical fission products as strontium, cesium, iodine and ruthenium are retained in the molten salt. In addition, it also has been found that numerous other radioactive products of fission also are retained in the molten salt, for example, the rare earths (La, Ce, Pr, Nd, Pm, Sm, and Eu) and yttrium would remain in the ash fraction as insoluble oxides. Further, the noble metals such as palladium and gold also would be retained in the molten salt. If radioactive amphoteric-like elements such as zirconium, niobium, molybdenum, technetium, and tellurium are present in the melt, they also will be retained in the molten salt as either an oxide or sodium salt compound. Thus, except for the inert gases, it has been found that most of the fission products are retained in the molten salt.

When the molten salt subsequently is processed in accordance with the aforementioned pending application of the assignee (the molten salt is mixed with an aqueous medium and filtered to remove the ash, and the filtrate is subsequently cooled to precipitate sodium chloride crystals), the disposition of the various fission products will be as set forth in Table 1 below.

TABLE 1

Fission Product Disposition in the
Molten Salt Radwaste Combustion Process Products

| Molten Salt Process Stream | Elemental Class | Elements | Ultimate Chemical Form |
|---|---|---|---|
| Offgas | Inert Gases | Kr, Xe | Elements |
| Ash | Alkaline Earths | Sr, Ba | Sulfate or Carbonate |
|  | Rare Earths | La, Ce, Pr, Nd, Pm, Sm, Eu | Oxides |
|  | Noble | Rh, Pd, Ag, Ru | Oxides or Metals |
|  | Amphoteric | Zr, Nb, Mo, Tc, Te | Oxides or Sodium Salt |
|  | Miscellaneous | Cd, Y | Carbonate, Oxide |
| NaCl Crystals | Alkali Metals | Rb, Cs | Chloride |
|  | Halides | Br, I | Sodium Salt |

From the foregoing table it is seen that substantially all of the fission products, even those of minor significance, are retained as stable solid disposable products (i.e., in the ash and sodium chloride) with the exception of the noble gases krypton and xenon. However, these noble gases are of minor importance, since they generally are removed in the uranium reprocessing plant and usually are not present in fission product contaminanted organic waste.

BRIEF DESCRIPTION OF THE DRAWING

The sole FIGURE of the drawing shows a schematic illustration of a system for practicing the method of the present invention.

DESCRIPTION OF PREFERRED EMBODIMENTS

Referring to the drawing, an organic waste containing at least one element selected from the group consisting of strontium, cesium, iodine and ruthenium is carried via a conveyor 10 to a shredder 12, which may be, for example, a hammermill. The shredded waste then passes via a conduit 14 into a solids-gas separator means such as a cyclone receiver 16. The shredded waste leaves cyclone receiver 16 through a valve 18 into a storage hopper 20, provided with a screw feeder 22. The shredded material leaving screw feeder 22 via a conduit 24 is mixed and conveyed with pressurized air from a compressor 26 passing through a conduit 28. The mixture of air and shredded waste passes through a conveyor 30 and is introduced into a molten salt combustion furnace 32, below the surface of a molten salt bath 34, which is maintained at a temperature of from about 400° C. to 1000° C. and under a pressure within the range of from about 0.5 to 10 atmospheres, to form gaseous and solid combustion products.

The gaseous combustion products consist essentially of water vapor and $CO_2$. An effluent gas, also including any unreacted oxygen from the air and the nitrogen content of the air, is withdrawn from the molten salt combustion furnace 32 and passed through a demister 36 and a conduit 38 into a water cooler 40 to reduce the temperature of the gas below about 250° C. The cooled gases leaving cooler 40 pass through a conduit 42 and a bag house filter 44 to remove the majority of the entrained particulates. The effluent gas then passes through a conduit 46 and into a filter 48, which removes most of the remaining particulates. The gases leaving filter 48 through a conduit 50 are introduced into a high energy particulate filter (HEPA) 52, wherein greater than 99% of the particles having a size greater than 0.2 micron are removed. The substantially particle-free gas leaves the HEPA filter via a conduit 54, a pump 56 and a conduit 58 to a stack 60 where it is vented to the atmosphere.

Intermittently or continuously a portion of the molten salt 34 is withdrawn via a conduit 62 for disposal. Alternatively, if the organic waste also contains substantial amounts of actinide elements, the salt may be further treated and processed in accordance with assignee's aforementioned patent application to separate the salt into ash and sodium chloride fractions and recover the actinide elements from the ash fraction. Makeup alkali metal carbonate and, optionally, alkali metal sulfate is added to molten salt combustion furnace 32 via a conduit 64.

Advantageously, to prevent the possible escape of any airborne radioactive particulates, conveyor 10, shredder 12, and storage hopper 20 are maintained at a subatmospheric pressure, for example, by withdrawing the gas from cyclone receiver, 16, via conduit 66 with a vacuum pump 68. A portion of the withdrawn gases is introduced into the prefilter and HEPA filter via a conduit 70. Another portion of the exhaust gas from vacuum pump 68 is introduced into shredder 12 via a conduit 72 and used as both a cover gas and a means of conveying the shredded waste from shredder 12 via conduit 14 to cyclone receiver 16.

The following examples are set forth to further illustrate the practice of the present invention and demonstrate its efficacy but are not intended to be construed as limiting its scope.

EXAMPLE 1

The following example demonstrates the combustion of a ruthenium-containing organic waste and retention of the ruthenium in a molten salt. Samples of ruthenium-contaminated waste were combusted in a molten salt bed comprising 85 wt.% sodium carbonate, 5 wt.% sodium sulfate, 5 wt.% NaCl, and 5 wt.% ash. The apparatus utilized was a laboratory scale combustor containing a 9-inch deep bed of salt. The offgas was monitored continuously for carbon monoxide, carbon dioxide, hydrocarbons, oxygen, nitric oxide, nitrogen dioxide and ammonia. Particulate samples were taken during each test to determine the average particulate loading in the offgas. Downstream of the particulate filter, dual aqueous scrubbers were used to trap ruthenium. Particulates and scrubber solutions were analyzed for ruthenium.

At the beginning of each test about one-half pound of the waste to be burned was placed in a feed hopper which was attached to the feed system. The combustion air feed rate was adjusted to about 2.5 scfm (approximately 1.0 ft/sec superficial velocity). The feed was then started and adjusted until the desired offgas composition was attained (approximately 4 to 6% $O_2$, and 12 to 16% $CO_2$). When steady state conditions were attained, the particulate sampler was started. A mixture of paper, plastic, rubber mix and ruthenium (approximately 400 mg of ruthenium per 200 grams of the mix) were introduced into the combustor at a rate of 7.1 grams per minute. The average combustion temperature was approximately 910° C. From analysis of the particulates collected in the offgas filters it was determined that greater than 99.9% of the ruthenium was retained in the melt. The foregoing procedure was repeated using a cation exchange resin (sulfonic acid) containing ruthenium as the organic waste. Analysis showed that greater than 99.9% of the ruthenium was retained in the salt.

EXAMPLE 2

Using the same apparatus as in the preceding example, an organic waste was combusted which comprised 50 wt.% paper and other cellulose materials, 8 wt.% polyvinyl chloride, 32 wt.% polyethylene and 10 wt.% rubber. This waste was contaminated with non-radioactive fission products by pouring an aliquot of known concentrations of strontium nitrate, cesium nitrate, europium nitrate, and sodium iodide over the waste. After mixing, some of the waste was dried overnight in an oven maintained at 90° C. before it was added to the combustor feed system. Eight different combustion tests were conducted. Each series of four combustion tests was made with the same melt in the combustor. Thus, the fission product concentration in the melt continued to increase in each of the two series of four tests. A portion of the offgas (approximately 10%) was sampled isokinetically and passed through a 0.2 micron pore filter to trap the particulates and subsequently through an aqueous scrubber to remove any of the volatile simulated fission products. The particulates on the filter and the aqueous solution in the scrubber were analyzed for strontium, cesium, europium and iodine to determine the proportion of the fission products found in the offgas. The particulates on the filter paper were analyzed by X-ray fluorescence and the aqueous solutions were analyzed by atomic absorption, flame photometry and specific ion electrode techniques. The results of these tests are set forth in Tables 2-6 below.

TABLE 2

Combustion Conditions and Offgas Analyses During Non-Radioactive Fission Product-Contaminated Waste Tests

| Test | Feed Rate (Kg/hr) | Comb. Time (hr) | Comb. Temp. (° C.) | $NO_x$ (PPM) | HC (PPM) | $O_2$ (%) | CO (%) | $CO_2$ (%) | Particulates (gm/m³)* |
|---|---|---|---|---|---|---|---|---|---|
| 1 | 0.28 | 0.70 | 900 | 53 | 10 | — | 0.15 | 8.5 | 0.53 |
| 2 | 0.22 | 0.98 | 878 | 76 | 13 | — | 0.18 | 8.8 | 0.53 |
| 3 | 0.27 | 0.93 | 878 | 87 | 22 | — | 0.18 | 8.7 | 0.41 |
| 4 | 0.23 | 1.51 | 875 | 59 | 20 | — | 0.23 | 8.9 | 0.41 |
| 5 | 0.22 | 0.93 | 810 | 33 | 10 | 12.3 | 0.05 | 8.1 | 0.17 |
| 6 | 0.24 | 0.85 | 812 | 33 | 10 | 12.8 | 0.05 | 8.0 | 0.11 |
| 7 | 0.25 | 1.02 | 801 | 91 | 10 | 11.0 | 0.05 | 8.7 | 0.10 |
| 8 | 0.24 | 1.06 | 816 | 120 | 10 | 10.7 | 0.05 | 9.0 | 0.13 |

*one gm/m³ = 0.44 grains/scf

TABLE 3

Cesium Disposition in Non-Radioactive Fission Product Contaminated Waste Combustion Tests

| | Cesium Concentration (ppm) | | Disposition of Cesium (wt. %) | | |
|---|---|---|---|---|---|
| Test | Waste* | Melt** | Scrubber | Particulates | Melt |
| 1 | 2198 | 59 | ND < 0.01 | ND < 28 | (> 72) |
| 2 | 6593 | 256 | ND < 0.01 | ND < 8.2 | (> 91) |
| 3 | 6593 | 490 | ND < 0.01 | ND < 2.5 | (> 97.5) |
| 4 | 2198 | 572 | ND < 0.01 | ND < 2.5 | (> 97.5) |
| 5 | 1109 | 47 | ND < 0.03 | ND < 11.0 | (> 88.9) |
| 6 | 1109 | 94 | ND < 0.02 | ND < 5.3 | (> 94.6) |
| 7 | 7028 | 458 | ND < 0.01 | ND < 1.0 | (> 98.9) |
| 8 | 8688 | 913 | ND < 0.01 | 0.5 | (99.5) |

*Added as cesium nitrate
**If all cesium in waste retained by melt
ND Not detected
( ) By difference

TABLE 4

Strontium Disposition in Non-Radioactive Fission Product Contaminated Waste Combustion Tests

| | Strontium Concentration (ppm) | | Disposition of Strontium (wt. %) | | |
|---|---|---|---|---|---|
| Test | Waste* | Melt** | Scrubber | Particulates | Melt |
| 1 | 1622 | 49 | ND < 0.01 | ND < 3.43 | (> 96.6) |
| 2 | 4865 | 212 | ND < 0.01 | ND < 0.99 | (> 99.0) |
| 3 | 4865 | 406 | ND < 0.01 | ND < 0.30 | (> 99.7) |
| 4 | 1622 | 474 | ND < 0.01 | ND < 0.29 | (> 99.7) |
| 5 | 450 | 19 | ND < 0.20 | ND < 0.90 | (> 98.9) |
| 6 | 450 | 38 | ND < 0.10 | ND < 0.42 | (> 99.4) |
| 7 | 2834 | 185 | ND < 0.02 | 0.30 | (99.7) |
| 8 | 3508 | 369 | ND < 0.01 | 0.21 | (99.8) |

*Added as Strontium Nitrate
**If all Strontium in waste retained in melt
ND Not detected
( ) By difference

TABLE 5

Europium Disposition in Non-Radioactive Fission Product Contaminated Waste Combustion Tests

| | Europium Concentration (ppm) | | Disposition of Europium (wt. %) | | |
|---|---|---|---|---|---|
| Test | Waste* | Melt** | Scrubber | Particulates | Melt |
| 5 | 436 | 18 | ND < 0.08 | ND < 2.3 | (> 97.6) |
| 6 | 436 | 37 | ND < 0.04 | ND < 1.1 | (> 98.8) |
| 7 | 2773 | 181 | ND < 0.01 | ND < 0.2 | (> 99.7) |
| 8 | 3424 | 360 | ND < 0.01 | ND < 0.1 | (> 99.8) |

*Added as Europium Nitrate
**If All Europium in waste retained in melt
ND Not detected
( ) By difference

TABLE 6

Iodine Disposition in Non-Radioactive Fission Product Contaminated Waste Combustion Tests

| | Iodine Concentration (ppm) | | Disposition of Iodine (wt. %) | | |
|---|---|---|---|---|---|
| Test | Waste* | Melt** | Scrubber | Particulates | Melt |
| 1 | 5,778 | 175 | < 0.01 | ND < 0.80 | (> 99.1) |
| 2 | 17,335 | 756 | ND < 0.01 | 1.39 | ( 98.6) |
| 3 | 17,335 | 1,446 | < 0.01 | 0.99 | ( 99.0) |
| 4 | 5,778 | 1,690 | < 0.01 | 1.78 | ( 98.2) |
| 5 | 218 | 9 | 0.07 | ND < 33.0 | (> 66.9) |
| 6 | 218 | 18 | 0.08 | ND < 15.0 | (> 84.9) |
| 7 | 1,389 | 90 | 0.11 | ND < 3.0 | (> 96.9) |

TABLE 6-continued
Iodine Disposition in Non-Radioactive Fission Product Contaminated Waste Combustion Tests

| Test | Iodine Concentration (ppm) Waste* | Melt** | Disposition of Iodine (wt. %) Scrubber | Particulates | Melt |
|---|---|---|---|---|---|
| 8 | 1,712 | 180 | 0.05 | ND < 1.5 | (> 98.4) |

*Added as Sodium Iodine
**If all Iodine in waste retained in melt
ND Not detected
( )By difference From the foregoing tables it is seen that in general no strontium, europium or cesium is detected downstream from the melt, which indicates that greater than 99.7% of the strontium, more than 99.8% of the europium, and probably in excess of 99.5% of the cesium are retained in the melt. In the cases where strontium, was detected (Runs 7 and 9), it is noted that at higher concentrations in the melt no strontium was detected downstream (Tests 3 and 4). It is presumed, therefore, that the analysis of strontium in the offgas for Runs 7 and 8 is in error. Where cesium was detected (Run 4) nearly equal melt concentrations (Runs 3 and 7) revealed no cesium in the particulates, so the detection in Run 4 is suspect.

Some iodine was found in the scrubber and particulates. It is believed to be due to the vaporization of sodium iodine from the melt. Nonetheless, in excess of about 98% of the iodine generally is retained in the melt. The data indicate that the iodine found in the offgas is approximately 65% of that which would be predicted from the vapor pressure of NaI. Thus, it is expected that if the actual concentration of iodine in the waste were 2–3 orders of magnitude less (as would be expected in the actual fission product waste), then the concentration in the offgas should be 2–3 orders of magnitude less than that found in these tests. Thus, one can expect greater than 99% retention of iodine in the melt when actual fission product contaminated organic waste is combusted.

While a preferred practice of this invention has been disclosed herein, many modifications thereof are feasible. Thus, while the invention has been described with reference to specific salts, waste and elements, and has been illustrated, in part, with various synthetically prepared or simulated fission product-containing wastes, many variations will be apparent to those versed in the art. Thus, the behavior of the selected fission product elements in the present process which results in their retention in the molten salt bath will be essentially identical for both radioactive and non-radioactive species.

What is claimed is:

1. A method of treating an organic waste containing at least one volatile compound-forming element selected from the group consisting of strontium, cesium, iodine, and ruthenium comprising:
   Introducing the organic waste and gaseous oxygen into a molten salt bath consisting essentially of an alkali metal carbonate or the mixture of an alkali metal carbonate and from 1 to 25 wt.% of alkali metal sulfate, said bath being maintained at an elevated temperature of from 400° to 1000° C. and under a pressure of from 0.5 to 10 atmospheres to at least partially oxidize and combust the organic waste, the selected element being retained in the molten salt bath.

2. The method of claim 1 wherein the molten salt bath consists essentially of the mixture of an alkali metal carbonate and from 1 to about 25 wt.% of an alkali metal sulfate.

3. The process of claim 1 wherein the molten salt bath consists essentially of sodium carbonate, or the mixture of sodium carbonate and from 1 to about 25 wt.% of sodium sulfate.

4. The method of claim 3 wherein the molten salt bath is maintained at a temperature of from about 800° to 900° C. and a pressure of from about 0.8 to 1.0 atmospheres.

5. The method of claim 1 wherein the selected element is cesium.

6. The method of claim 1 wherein the selected element is ruthenium.

7. The method of claim 1 wherein the selected element is strontium.

8. The method of claim 1 wherein the selected element is iodine.

9. The method of claim 1 wherein the organic waste initially contains strontium, cesium, iodine, and ruthenium, and wherein all four elements are retained in the molten salt bath.

10. The method of claim 9 wherein the molten salt bath consists essentially of the mixture of an alkai metal carbonate and from 1 to about 25 wt.% of an alkali metal sulfate.

* * * * *